July 8, 1958
S. E. COLEY
2,841,877
PLUG GAUGE
Filed Oct. 14, 1955
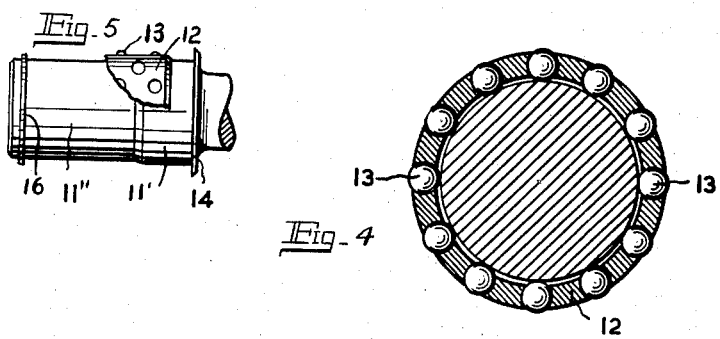
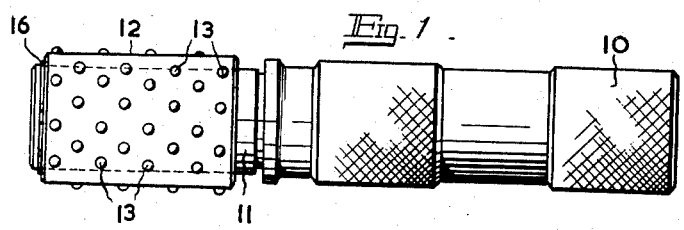
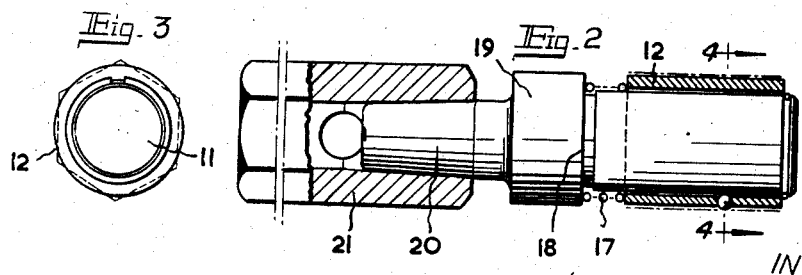
INVENTOR
SAMUEL ERNEST COLEY
BY Walter S. Olerton
ATTORNEY United States Patent Office 2,841,877
Patented July 8, 1958

2,841,877

PLUG GAUGE

Samuel Ernest Coley, Shirley, England

Application October 14, 1955, Serial No. 540,602

Claims priority, application Great Britain
October 27, 1954

4 Claims. (Cl. 33—178)

This invention relates to a new or improved plug gauge for the internal gauging of bores in cylinders, bushes, sleeves and the like.

The usual plug gauge comprises a hardened and ground cylindrical member which is provided with a handle and is adapted to be inserted axially into the bore to be gauged. When working to very fine limits of the order of two or three ten-thousandths of an inch the axis of the gauge has to be in accurate alignment with the axis of the bore to allow the gauge to enter, and even when great care is exercised the gauge is liable to jam in the bore and difficulty is experienced in freeing it. Further, if the gauge jams in the bore the operator may be led to think that the bore is under size when in fact it is not. When the gauge is used for checking the bore of a component which is being ground to size and the gauge jams in the bore the effort of freeing it may cause movement of the component in the chuck or other fixture in which it is held, and if this occurs the component has to be scrapped as further grinding would produce an oval or oversize bore. Further, if force is used in withdrawing the gauge it may come out suddenly and bring the gauge or the operator's hand into contact with the grinding wheel. Accidents are also caused by the gauge jamming in and rotating with the component if the operator inserts the gauge into the bore before the machine has stopped.

One object of the invention is to provide an improved plug gauge which is free from these objections and which permits gauging to very fine limits to be effected rapidly and easily.

According to the invention a plug gauge comprises a cylindrical body or core on which is mounted a cylindrical sleeve or cage having spaced radial apertures housing freely rotatable steel balls of uniform diameter, the effective diameter of the gauge being equal to the diameter of the body or core added to twice the diameter of a ball.

The apertures in the sleeve or cage are conveniently arranged in rings at right angles to the axis of the sleeve or cage and the apertures in adjacent rows may be in lines parallel to or inclined at a small angle to that axis. The balls are freely rotatable in the apertures but the ends of the apertures are peened over or otherwise treated after insertion of the balls so that the balls are prevented from dropping out.

The internal diameter of the sleeve or cage is slightly greater than the diameter of the core or body and the diameter of the balls is slightly greater than the radial thickness of the sleeve or cage so that when the gauge is in use the balls are in contact with the surfaces of the body or core and of the bore to be gauged but the sleeve or cage is not in contact with either surface.

The surface of the body or core is hardened and ground but as there is no wear on the sleeve or cage, that can be made of ordinary mild steel or similar material. The sleeve or cage is freely rotatable on the body or core so that the balls are not liable to cause wear of any particular parts of the surface of the body or core.

The sleeve or cage may be confined against axial movement on the body or core but preferably it is allowed a limited axial movement. It may, for example, be allowed axial movement between an annular shoulder at the inner end of the body or core and a spring ring located in an annular groove at the outer end of the body or core. A light spring may be located between the inner end of the sleeve or cage and the shoulder on the body or core to urge the sleeve or cage towards its outermost position.

The body or core may be stepped in diameter, a portion at the inner end being of a diameter greater than the outer end by an amount equal to the maximum permitted tolerance in the bore to be gauged, so that when the gauge is inserted into a bore of the correct diameter the balls in engagement with the outer part of the body or core will enter the bore but those in engagement with the inner part will not. In that case there may be an axial gap between the balls in engagement with the two portions of the body or core.

In an alternative arrangement a cylindrical portion of the body of a diameter slightly greater than the maximum permitted diameter of the bore to be gauged may be located beyond the inner end of the sleeve so that the whole of the sleeve carrying the balls will enter a bore of the correct diameter but the cylindrical inner portion of the body will not.

The body or core will be provided with any convenient form of handle which may be integral or may be a separate member.

Some practical forms of gauge in accordance with the invention are illustrated by way of example in the accompanying drawings in which:

Figure 1 is a side elevation of a gauge in which the sleeve is permitted a limited axial movement.

Figure 2 is a longitudinal section of another gauge.

Figure 3 is an end view of the gauge shown in Figure 2.

Figure 4 is a cross-section on a larger scale on the line 4—4 of Figure 2.

Figure 5 is a side elevation of a modified form of the core, a portion of a sleeve as illustrated in Figure 1 being shown on the core.

The gauge shown in Figure 1 comprises a handle 10 having at one end an integral cylindrical body or core 11 having a hardened and ground surface. Fitting over the body or core is a cylindrical sleeve or cage 12 in which are formed rings of radial apertures housing rotatable steel balls 13 of uniform diameter. The balls are freely rotatable in the apertures but the ends of the apertures are peened over or otherwise treated after insertion of the balls so that the balls are prevented from dropping out. The balls are arranged in rings at right angles to the axis of the sleeve but those in adjacent rows are staggered so that the balls are in longitudinal lines inclined at an angle to the axis. The sleeve 12 is located axially between a shoulder 15 at the inner end of the body or core 11 and a spring ring 16 located in an annular groove in the body or core at its outer end.

In the gauge shown in Figure 1 the sleeve 12 carrying the balls is allowed a limited axial movement on the cylindrical body or core 11 to facilitate the entrance of the gauge into a bore. The body or core is of substantially greater length than the sleeve and the sleeve is axially movable between a shoulder 15 at the inner end of the body or core and a spring ring 16 at the outer end.

In this gauge the balls are arranged in rings with the balls in adjacent rings staggered with respect to each other by angles equal to half the angular spacing of the balls in each ring.

In the gauge shown in Figures 2, 3 and 4 the sleeve 12 is allowed a limited axial movement on the body or core 11 and is normally held in its outermost position by a light compression spring 17 located between the inner end of the sleeve and a shoulder 18 so that the sleeve can slide axially on the body or core against the action of the spring as the gauge is being inserted into a bore.

The shoulder 18 is formed by the inner end of a cylindrical hardened and ground portion 19 of the body or core which portion 19 is of an external diameter slightly greater than the maximum permitted diameter of the bore to be gauged. The diameter over the balls in the sleeve 12 is equal to the minimum permitted diameter. The gauge thus acts as a "go" and "no-go" gauge, the sleeve entering a bore of the correct diameter within the permitted limits while the cylindrical part 19 will not enter.

In this gauge the body or core instead of being integral with the handle is formed with a tapered shank 20 adapted to fit into a complementary socket in a standard gauge handle 21 of hexagonal cross-section.

Tests have shown that the improved gauge is free from any risk of jamming in a bore to be gauged. When a bore is being ground to size the gauge can be entered into the bore while it is still two or three ten-thousandths of an inch under size because the balls are resiliently compressible to that extent, but there is substantial resistance. The gauge however does not jam in the bore and can be withdrawn again without difficulty.

When the bore is the correct size the gauge enters smoothly with a degree of resistance which can be readily appreciated, and with very little practice an operator can gauge a bore to within one or two ten-thousandths of an inch.

If the sleeve or cage is axially movable on the body or core against light spring loading the spring is compressed as the balls roll forwardly into the bore if the bore is still slightly under size, but when the finished size is reached the gauge will enter the bore without appreciable compression of the spring. If the gauge is provided with a "no-go" portion at its inner end as shown in Figures 2, 3 and 4 this portion forms a stop for the gauge when it engages the outer end of the bore.

In Figure 5 the body or core is stepped in diameter so that the balls at the inner end engage with the portion 11' of greater diameter and the diameter over these balls is greater than the diameter over the balls in engagement with the portion 11' of less diameter. The difference in diameter is equal to the maximum permitted tolerance in the bore to be gauged. The gauge thus acts as a "go" and "no go" gauge and when it is inserted into a bore of the correct diameter the balls in engagement with the outer part of the core will enter the bore but those in engagement with the inner part will not.

It will be appreciated that the difference in diameter will be of the order of two or three ten-thousandths of an inch and it has been greatly exaggerated in Figure 5.

Tests also show that the improved gauge can be used for bores of relatively soft material without scoring, scuffing or distortion of the bore.

The improved gauge will have a much longer working life than the normal plug gauge owing to the reduction of friction, but if after prolonged use wear should take place the gauge can be restored to size by fitting a new sleeve containing graded oversize balls.

I claim:

1. A plug gauge comprising a cylindrical body, a cylindrical sleeve fitting over said body and being axially movable with respect thereto, said body including spaced abutments to limit the axial movability of said sleeve, said sleeve having a slightly larger inner diameter than the outer diameter of said body and being provided with apertures, freely rotatable balls of uniform diameter housed in said aperatures, the diameters of said balls being greater than the radial thickness of said sleeve so that said balls can roll on said body while simultaneously projecting radially outwards from said sleeve, and said sleeve including means to prevent said balls from dropping out of said apertures.

2. A plug gauge as claimed in claim 1, further comprising a spring between one of said abutments and said sleeve and tending to urge said sleeve towards its outermost axial position on said body against said other abutment.

3. A plug gauge comprising a body having two coaxially adjacent cylindrical portions of slightly different diameters, a cylindrical sleeve fitting over said body and being axially movable with respect thereto, said body including means to limit the axial movability of said sleeve, said sleeve having an inner diameter slightly larger than the larger diameter of said two body portions and being provided with spaced radial apertures, freely rotatable balls of uniform diameter housed in said apertures, the diameters of said balls being greater than the radial thickness of said sleeve so that said balls can roll on said body portions while simultaneously projecting radially outwards from said sleeve, and said sleeve including means to prevent said balls from dropping out of said apertures.

4. A plug gauge comprising a body having a cylindrical end portion, a cylindrical sleeve fitting over said portion and being axially movable with respect thereto, said body including abutments to limit the axial movability of said sleeve, said sleeve having a slightly larger inner diameter than the outer diameter of said portion and being provided with apertures, freely rotatable balls of uniform diameter housed in said apertures, the diameters of said balls being greater than the radial thickness of said sleeve so that said balls can roll on said portion while simultaneously projecting radially outwards from said sleeve, said sleeve including means to prevent said balls from dropping out of said apertures, and a second cylindrical body portion coaxial with said first portion, said second portion being hardened and ground and having a diameter slightly greater than the outer surface defined by said balls.

References Cited in the file of this patent

UNITED STATES PATENTS

| 1,229,930 | Friedman | June 13, 1917 |
| 2,000,535 | Peisch | May 7, 1935 |
| 2,381,491 | Emmerton | Aug. 7, 1945 |
| 2,455,347 | Andered et al. | Dec. 7, 1948 |

FOREIGN PATENTS

| 766,936 | Great Britain | Jan. 30, 1957 |